United States Patent [19]

Sutter

[11] Patent Number: 4,853,764
[45] Date of Patent: Aug. 1, 1989

[54] METHOD AND APPARATUS FOR SCREENLESS PANORAMIC STEREO TV SYSTEM

[75] Inventor: Hans E. Sutter, Lima, Peru

[73] Assignee: Pedalo, Inc., West New York, N.J.

[21] Appl. No.: 245,403

[22] Filed: Sep. 16, 1988

[51] Int. Cl.⁴ .............................................. H04N 15/00
[52] U.S. Cl. ........................................ 358/3; 358/64; 358/88; 358/254
[58] Field of Search ................... 358/3, 64, 88, 248, 358/249, 254

[56] References Cited

U.S. PATENT DOCUMENTS

| | | | |
|---|---|---|---|
| 2,301,826 | 11/1942 | Steudel et al. | 358/88 |
| 2,955,156 | 10/1960 | Heilig | 358/88 |
| 3,059,519 | 10/1962 | Stanton | 358/248 |
| 3,376,381 | 4/1968 | Ratlif, Jr. | 358/88 |
| 3,504,122 | 3/1970 | Ratliff, Jr. | 358/88 |
| 3,614,314 | 10/1971 | Rossire | 358/88 |
| 3,670,097 | 6/1972 | Jones | 358/91 |
| 3,784,738 | 1/1974 | Natter | 358/92 |
| 3,833,300 | 9/1974 | Rymes | 356/13 |
| 4,153,913 | 5/1979 | Swift | 358/93 |
| 4,190,856 | 2/1980 | Ricks | 358/88 |
| 4,310,849 | 1/1982 | Glass | 358/88 |
| 4,559,555 | 12/1985 | Schoolman | 358/88 |
| 4,605,959 | 8/1986 | Colbaugh | 358/93 |
| 4,636,866 | 1/1987 | Hattori | 358/236 |
| 4,641,178 | 2/1987 | Street | 358/3 |
| 4,647,966 | 3/1987 | Phillips et al. | 358/88 |
| 4,692,792 | 9/1897 | Street | 358/3 |
| 4,695,129 | 9/1987 | Faessen et al. | 350/96.25 |
| 4,706,117 | 11/1987 | Schoolman | 358/88 |
| 4,743,964 | 5/1988 | Allard | 358/3 |

OTHER PUBLICATIONS

Galluzzo, Tony, "Video Journal", *Modern Photography*, Feb., 1988, pp. 16, 24, and 116.

*Primary Examiner*—Howard W. Britton
*Attorney, Agent, or Firm*—Kenneth Watov; David Jackson; Stefan Klauber

[57] ABSTRACT

A portable stereo audio and video receiver comprises a self powered pocket sized receiver and control unit for supplying stereo audio and stereo video signals to a headset worn by a user, with the headset including a pair of headphones for mounting over the ears of the user to provide stereo sound, and a pair of goggle-like enclosures positioned in front of the eyes of the user, each enclosure including a set of three miniature monochrome video displays, a color superpositioning device; and associated optics, for providing color images to the associated eye of a user, for producing a panoramic color 3D image in the brain of a user.

37 Claims, 5 Drawing Sheets

METHOD AND APPARATUS FOR SCREENLESS PANORAMIC STEREO TV SYSTEM

FIELD OF THE INVENTION

The present invention relates generally to video systems, particularly to television systems, and more particularly relates to such systems for providing both a panoramic stereo video presentation, and stereo audio presentation to a viewer.

BACKGROUND OF THE INVENTION

The present invention makes use of those natural acoustical and optical effects that produce in a human brain the psycho-physical sense of spatial comprehension, size and depth perception, i.e. the sense of actually being present at the observed scene.

The stereo audio effect is based on the difference in time in perceiving certain sounds in one ear relative to the other ear, permitting the hearer to determinate the direction or origin of the sound. Each ear hears the same sound, but one of them perceives the sound a little earlier than the other. Differences of 1/10,000 of a second are detected.

The stereo video effect is based on the dislocation of a certain object projected to the background by each eye, permitting the viewer to determine the distance of that object from the eye. Each eye sees the same object, but from a different angle.

The present invention uses these audio and video stereo effects in combination with a chromatic superposition that permits image amplification for obtaining panoramic viewing in either monochrome or color of stereo television programs in order to simulate one's sense of actual presence.

Television studios are now broadcasting three-dimensional television programs (hereinafter referred to as 3DTV), which programming includes both stereo audio combined with three-dimensional video. Typically, such programs are produced through the use of two microphones placed at a distance from one another, and two video cameras placed a distance from one another, for producing stereo audio and stereo video signals, respectively. The two audio components are typically designated as the right and left component, respectively, and are transmitted over separate frequencies, whereas the two video components are typically transmitted over the same frequency, with each of the stereo video components being separated from one another by intermittence or picture by picture. Each of the alternately and successively transmitted pictures (usually 625 or 525 lines) is preceded by a conventional signal for identifying it as the right or left picture, relative to a viewer.

Although the typical stereo video transmission is obtained via alternately transmitted video components as indicated above, the intermittency of the two components does not cause a perceptible blinking to a viewer, because of the persistence of the phosphorescence of the television screen that maintains the image for a period of time overcoming the human eye's inertia. However, the human ear does not have the analogous inertia of the human eye, making it necessary to transmit the two stereo audio components over different frequencies, in typical applications.

The present inventor is aware of a number of known 3DTV systems. In some of these systems, the two audio components are reproduced via associated loudspeakers placed on each side of the television receiver, in a manner similar to FM stereo radio receivers, and in other ones, earphones are directly positioned over each corresponding ear. Referring to the video components, in one of these systems, the right side video signal is reproduced in a green color on the cathode ray tube or video screen, whereas the left image is projected on the screen in red. The two images then appear superimposed on the viewing screen. A viewer must wear eyeglasses with red filter lenses for the right eye and green filter lenses for the left eye, to insure that each eye only receives its associated color component, for causing a three-dimensional image to be produced in the brain of the viewer, who perceives a black and white scene (monochrome viewing).

In a second known stereo television system, more complicated eyeglasses are required. The eyeglasses include layers of glass liquids, that is, liquid crystal means, for gating the left and right video signals to the left and right eyes, respectively synchronized with the intermittent left/right image component simultaneously projected on a screen, for producing a three-dimension television effect. The second system permits 3DTV reception in color.

A third system that the present inventor believes is still under development is based on holographic technology. Laser rays are utilized in the latest holographic systems for producing a three-dimensional video effect without the requirement for special glasses to be worn by a viewer.

A fourth system, shown in Glass U.S. Pat. No. 4,310,849, issued on Jan. 12, 1982, entitled "Stereoscopic Video System" shows a 3DTV system in which the viewer wears a headset. The system includes a VHF television receiver for receiving one monoscopic television image, and a UHF television receiver for receiving a second monoscopic image, each for presentation on miniature cathode ray tubes, located at a remote place. Fiber optic cables are coupled to the face of the cathode ray tubes via an optical system at one end of the cable, and at the other end of the cable another optical system couples the fiber optic cable to right and left eyepieces, respectively, for presenting the images to the right and left eyes of a viewer. Another cable conducts stereophonic audio signals to right and left earphones incorporated in the headset. A field of view of about 60 degrees is provided for each eye to permit each eye to see the entire image on its associated fiber optic bundle. Several other prior art systems also use a headset similar to the fourth one, with a pair of mini CRT's or LCD's mounted in the eyeshield, with their associated optical means. (See U.S. Pat. Nos. 4,706,117; 4,636,866; 4,559,555; and 2,955,156).

The fourth of the above prior 3DTV systems allows for individualization of viewing, in that in the other prior systems each viewer in a room sees and hears the same program. Furthermore, in the three first named prior art systems, a user perceives not only the screen picture and its associated sound, but also perceives surrounding objects and the sound of the habitat, which disturbs the user's identification with the transmitted scene being viewed. In the fourth prior art system this "video and audio noise" is suppressed, thereby restoring a user's liberty to take place commodiously, without the necessity to look constantly at a screen as he is forced to do in the first three prior art systems.

Furthermore, the first and third prior art systems do not allow color pictures, only monochrome ones. The fourth system has additional disadvantages such as poor image resolution (limited by the number of color points or pixels, by the number of optic fibers in the bundle), which impedes image amplification for panoramic viewing, and creates a constant risk of image distortion by bending the optic cable. Further, note that some of these prior stereo vision systems for recording of TV programs require simultaneously two recorder units, one for each channel. This is possible with common home facilities, but not the replay of recorded programs, for it is substantially impossible to bring and maintain two tape players in phase, and maintain them in phase one to the other in home facilities, i.e. these systems do not allow home recording and replay of TV programs at home.

Also, none of the prior 3DTV systems is capable of producing a true panoramic effect. As a result, the viewer does not perceive himself or herself to be "inside" the scene being viewed.

SUMMARY OF THE INVENTION

A first object of the invention is to provide a screenless (or screen independent) television system.

Another object of the invention is to provide an improved three-dimensional television system.

Another object of the invention is to provide stereo television and stereo audio in a single system.

Yet another object of the invention is to provide an improved three-dimensional television system offering personal or individualized use by a viewer without disturbing others in the same room or area who may or may not be using other of the present three-dimensional television systems.

Still another object of the invention is to provide an improved three-dimensional television system including a color display.

Another object of the invention is to provide a three-dimensional television system, including stereo audio, that provides a viewer with a panoramic three-dimensional scene, in which the viewer perceives himself or herself to be part of the scene under observation.

Further, more objects of the present invention refer to its wide application spectrum as a universal man-machine interface, with potential applications including:

(1) navigation systems for visual interpretation of sonar and radar signals;

(2) industrial fishing, visualizing fish banks in stereo images;

(3) air traffic and aircraft control systems for instrument piloting by conversion of received earth station signals into stereo images with possible combination of machine echo sound as stereophonic images via earphone;

(4) military applications such as stereo night observation of objects illuminated by artificial light with a frequency spectrum out of human perception, or by amplification of feeble natural night light otherwise out of human perception;

(5) various scientific applications including stereo observation of surgical operations for medical students;

(6) air, ship, railway, motorcar, roomship, etc., traffic simulation for apprenticeship and becoming accustomed with control systems and instruments;

(7) computer generated stereo graphics and stereo images;

(8) electronic games, with stereo view and sound, independent of other person's games and noise, and without molesting other persons; and (9) other non-TV applications, and so forth.

Note that in the first four mentioned applications, the two "video" cameras must be distanced one from the other much more than the common eye distance, in order to extend space perception up to larger object distances.

With these objects and others not mentioned, and the problems of the prior art in mind, the present invention includes goggle or headset means incorporating a pair of earphones for each ear of the user for providing stereo sound, and a pair of optical systems placed directly between each eye of the user or viewer, and a pair of triple monochrome miniature video display devices, respectively, for presenting one color image of the scene being viewed to one eye, and another color image of the scene being viewed to the other eye, for effectively providing the viewer with a three-dimensional panoramic view of the scene, and making the viewer part of that scene. The video presentation is in color, where in contrast to the pair of color CRT's of the fourth mentioned prior system, a pair of three monochrome CRT's (or similar mini video display means) are used. The present inventor discovered that by using such pairs of triple display devices, image amplification for providing panoramic viewing is obtained. Note that in prior art 3DTV systems known to the inventor, the color image cannot be amplified for providing a panoramic sight angle, because of the poor definition in the mini color display means used in such systems. Monochrome CRT devices such as used in the present invention are not limited in resolution to the number of the holes in the shadow mask as in mini color displays. The image of monochrome mini CRT devices is continuous, and thereby provides image amplification with high resolution. The image superposition of the three monochrome CRT (green, blue, red, respectively) devices produces the color image. The three monochrome mini CRT displays or devices can be substituted by three black and white ones, using color filters or colored objective lens.

The invention provides, in principle, two optical modes: "A" by simple projection superposition, or "B" by using dichroic plates (or mirrors). In both modes, in a preferred embodiment, objective lenses are positioned near the display means, for producing an amplified real image. The image is further amplified by using an ocular lens near the eye of the viewer, for converting the image to a virtual image that is viewed by the user. This two stage amplification produces a panoramic effect for the 3D image, permitting sight angles as high as 150 degrees. Such wide sight angles can only be obtained with continuous or high definition images, such as obtained via the phosphor coating on the faces of monochrome CRT devices.

BRIEF DESCRIPTION OF THE DRAWINGS

Various embodiments of the present invention are described with reference to the drawings, wherein similar items are identified by the same reference designation, in which.

DESCRIPTION OF THE PREFERRED EMBODIMENTS OF THE INVENTION

As will be described in detail, the present inventor discovered that by substituting for each of the two mini color CRT displays used in prior stereo TV headsets, three monochrome mini CRT displays, image amplification is obtained without unacceptable resolution caused by the amplified structure elements produced by the shadow mask in mini color CRT's. Through such use of mini monochrome CRT's, image amplification up to 150 degrees (typically 120 degrees) of the sight angle cable obtained for providing an undisturbed panoramic view, with high resolution made possible via use of the continuous phosphor coating in the monochrome mini CRT's. Also, three monochrome mini CRT's are less expensive than one high precision mini color CRT.

A pair of superposition mechanisms (optical means) and the monochrome CRTs are conveniently mounted in goggles of a headset, preferably in separate or individual enclosures relative to each eye, for providing eye distance adjustment means, as will be described. The design of these enclosures or housings depend upon the optical mode or configuration. In the 'A' mode (simple projection), in the preferred embodiment the three monochrome mini CRT displays in each enclosure are placed sidewards on the viewer's head (in order to shift the gravitational center of the goggles backward) and mounted in parallel, whereas in the 'B' mode (dichroic) of the preferred embodiment the mini CRT displays are placed before the viewer's eyes, in a trifocal crosswise order. The headset can also include additional devices, such as earphones, microphones, manual adjustment devices, and so forth.

Referring to the video and audio transmission and reception, the present invention uses preferably one single TV channel, where right and left video components are transmitted over the same carrier frequency, with image by image intermittency. Nevertheless, other transmission forms can be employed by use of a special multiple selection interface, as will be described.

Figure 1A:
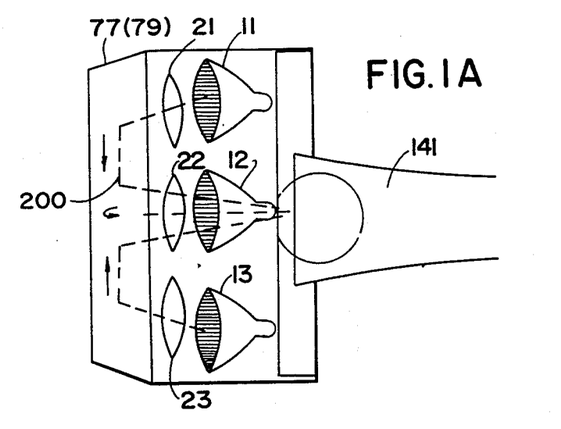
FIG. 1A shows a pictorial side elevation view of the simple projection modes of the three monochrome CRT displays of one embodiment of the invention, for example.
Figure 1B:
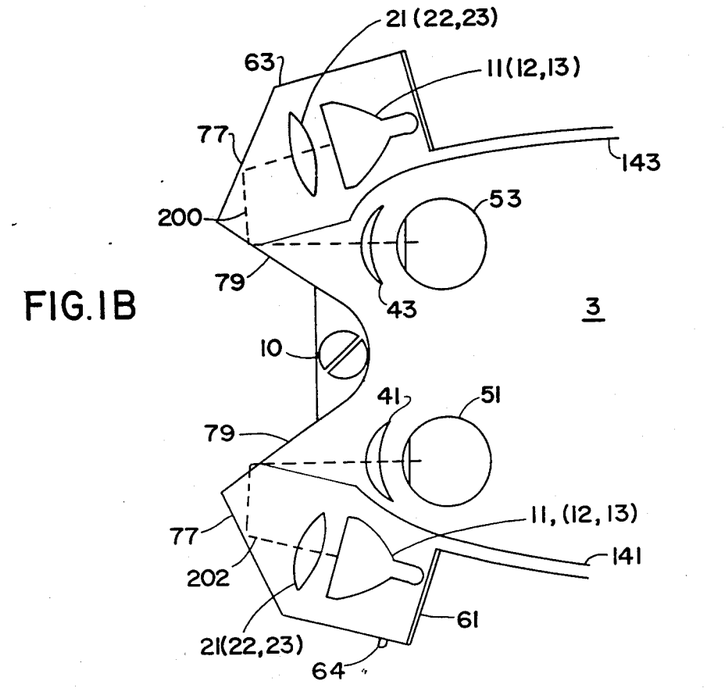
Fig. 1B shows a top view of the CRT displays of Fig. 1A as incorporated in one embodiment of the invention.

A more detailed description of the invention will now be given with reference to FIGS. 1A and 1B. The three mini CRT's 11, 12 and 13 are placed sideways of the viewer's head 3, where the objective lens 21, 22 and 23 are displaced slightly to the center, for convergency purposes. Color filters (red, green and blue for CRT's 11, 12 and 13, respectively, for example) are not shown. The image rays 200 and 202 are twice reflected by plane mirrors 77 and 79. Next, the real image produced by the objective lenses (21, 22 and 23, respectively) is converted into a virtual image by the ocular lenses 41 (43). The user's eyes 51, 53 see the virtual image.

Figure 2A:
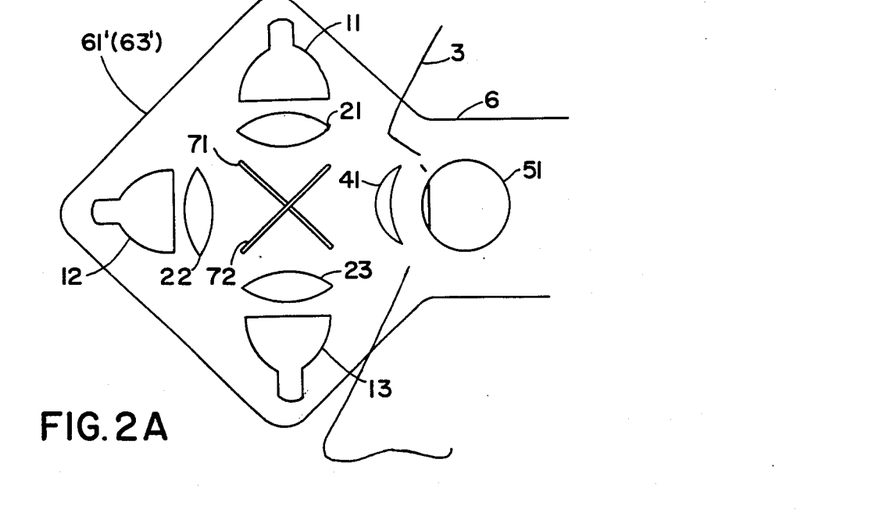
FIG. 2A shows a pictorial side elevational view of a dichroic mode, where the three mini CRT's are mounted in a trifocal manner, showing the crosswise placed dichroic mirrors (transparent and reflective plates), for example, of another embodiment of the invention.
Figure 2B:
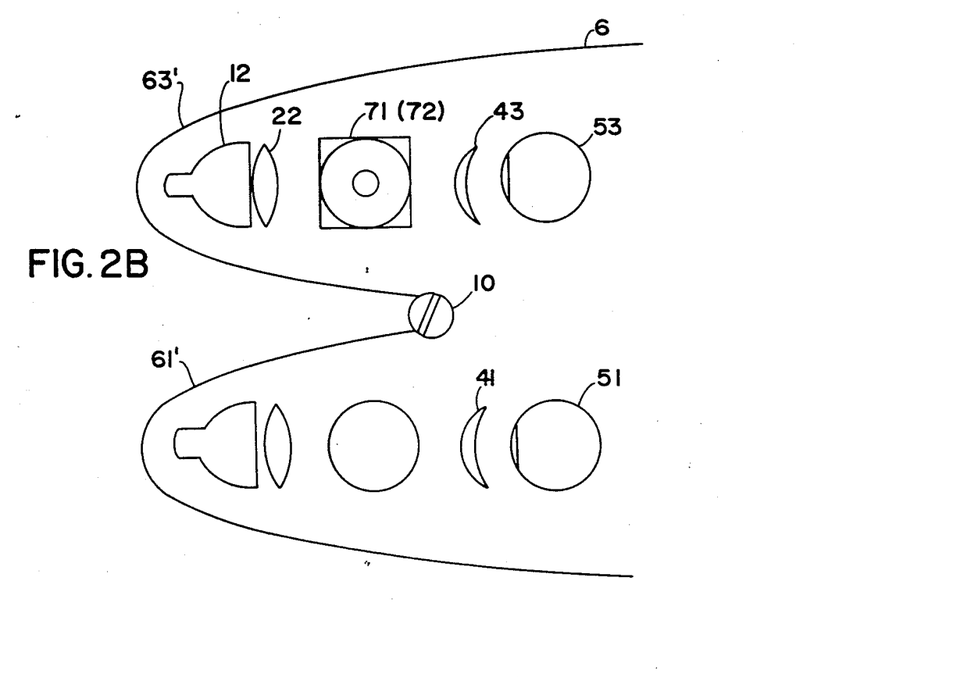
FIG. 2B shows a top view of the embodiment of FIG. 2A.
Figure 3:
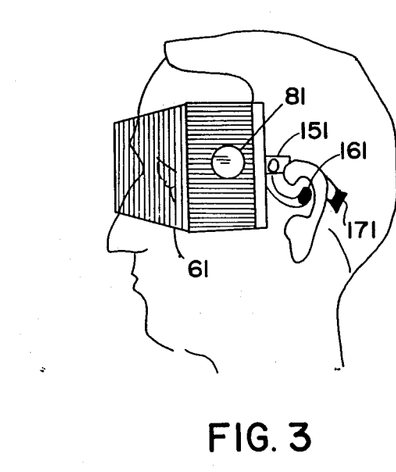
FIGS. 3 to 5 show pictorial views from different angles, respectively, of goggles or "headsets" for a projection mode embodiment of the invention.
Figures 4, 5, 6:
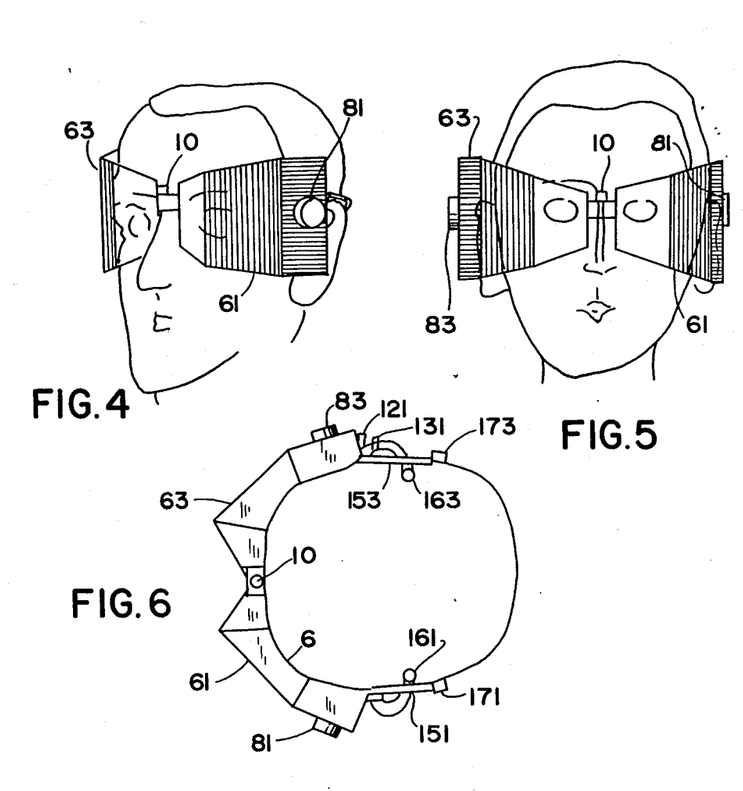
FIG. 6 shows a top view of the goggles or "headset" of FIGS. 3 through 5.
Figure 7:
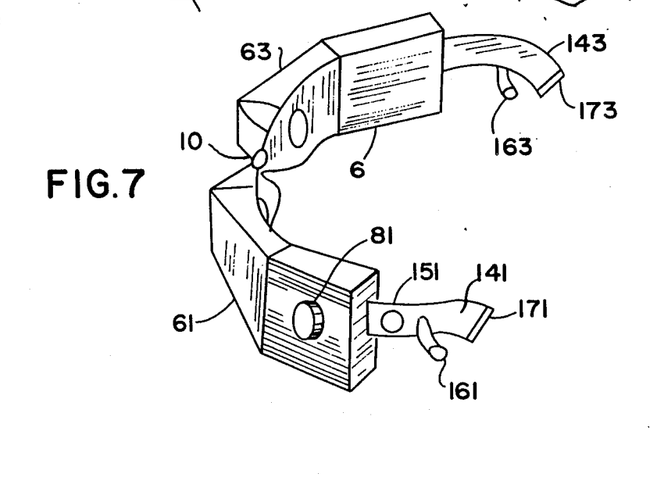
FIG. 7 shows a perspective view of the goggles or "headset" of FIG. 3.
Figure 8:
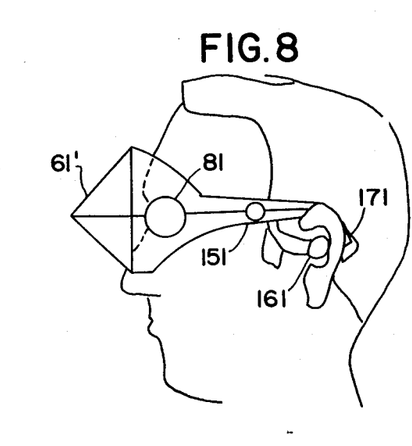
FIGS. 8 to 10 show a dichroic mode arrangement of another embodiment of the invention, with the goggles or "headset" thereof seen from different angles, respectively.
Figure 9:
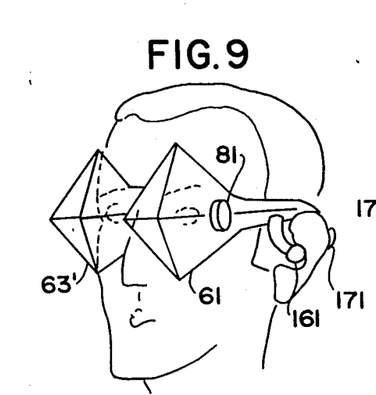
Figure 10:
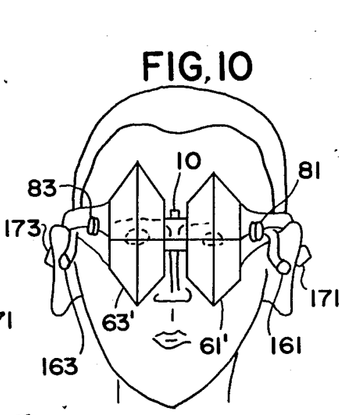

Referring to FIGS. 2A and 2B, the three mini CRT's 11, 12, and 13 include means such as color filters, for example (not shown) for projecting red, green, and blue image rays, respectively, for example, and are mounted trifocalwise in an enclosure or goggle 61 (63). The displayed images are converged by objective lenses 21, 22 and 23 (eventually through color filters, not shown, for providing the previously mentioned color projecting means, in this example) into a real image, passing through a crossed dichroic plate system 71, 72. Plate 71 reflects blue rays and passes red and green light waves or rays whereas plate 72 reflects red light rays and passes green and blue light rays. The result is an amplified real image in color that is converted by ocular lens 41 (43) into a further amplified virtual image seen by the user's eye 51 (53).

With reference to FIGS. 3 through 7 for the projection mode, or FIGS. 8 through 12 for the dichroic mode, in either mode, a focus adjustment knob 81 (83) permits the moving of ocular lens 41 (43) over the optical axis 91 (93), for individual focusing according to each eye individual dioptry. Rack and pinion gearing (not shown) can be used as part of the adjustment mechanism, for example.

For providing adjustment to a user's individual eye-distance (and head size), the cases or enclosures 61 (61') and 63 (63') can be distanced one to the other, by adjustably separating them over a rail or rack and pinion (not shown) and fixed at a convenient distance by a locking screw 10.

Also, interruption switches 121, 131 are mounted on eye enclosure 63 (63'). Switch 121 provides selective turn on and off of the TV audio, whereas switch 131 permits selective turn on and turn off of two microphones 171 and 173, via standard mechanisms (not shown). The microphones 171 and 173 are mounted behind earphones 161 and 163, respectively, in a conventional manner. When connected, the microphones 171, 173 provide a user 3 with stereophonic perception of surrounding sound. This permits a user 3 to hear the TV program commentaries of other persons in close proximity who see the same program, and to take part in conversations while the TV programming is being observed, for example. The sound received via microphones 171 and 173 is blended into the transmitted audio for the TV programming via conventional techniques. Turn-knobs 151 and 153 are mounted on headset arms 141 and 143 for providing audio volume control for each ear.

Figures 11, 12, 13:
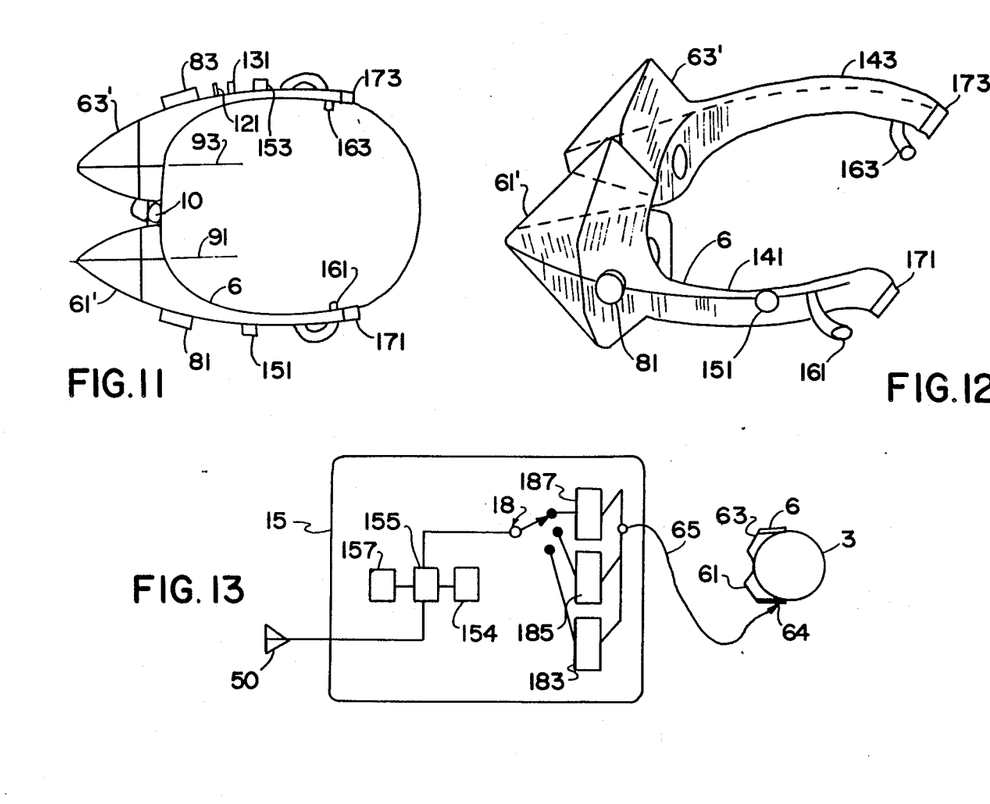
FIG. 11 shows a top view of the goggles of the embodiment of FIGS. 8 through 10.
FIG. 12 shows a perspective view of the goggles of the embodiment of FIGS. 8 through 11.
FIG. 13 shows a block diagram for a "pocket set" electronic module in use with an associated headset or goggle, of yet another embodiment of the invention.

FIG. 13 shows a preferred embodiment of the invention, consisting of two parts: the pocket set 15 and the headset 6. Signals from individual antenna 50 are fed to receiver 155, powered by battery or energy source 154 and controlled by a conventional control unit 157 for tuning, volume and on/off controls. The selection box interface is incorporated in the pocket set 15, and consists of a three-position switch 18 for distribution of demodulated signals conventional to electronic units 183, 185 or 187.

Unit 183 is expected to be most often used relative to the other units 185 and 187. This unit 183 consists of a conventional electronic device providing, for example, a trigger like circuit (not shown) to hold a left (right) eye connection during the time of occurrence of an associated left side (microtubes 11, 12 and 13 are activated) image, and then switch to the right (left) eye connection for providing associated right side image signals (right side microtubes 11, 12, and 13 are activated), for conforming to the image intermittency or transmitted image signals, used in the above second mentioned prior art 3DTV (using the image-end-signals for trigger switching), for example.

Unit 185 consists of conventional circuitry for reception of presently infrequently broadcasted green/red 3DTV programs of the first mentioned prior art 3DTV. These programs can be received in any conventional color TV receiver, using eyeglasses with green and red color filters. In the 185 unit, signals representing a red color image are led to a user's left eye from associated microtubes 11, 12, and 13, and signals representing a green color image are directed to a user's right eye from associated microtubes 11, 12 and 13. A user perceives a 3D image in monochrome, but the image is enlarged to provide a panoramic view.

Unit 187 consists of circuitry for reception of conventional 2D color programs, by feeding all image signals simultaneously to all microtubes 11, 12, and 13 associated with a user's right and left eyes. In this example or embodiment, the invention provides a screen independent improved 2D vision relative to conventional TV, in color, panoramic, individualized viewing, free of video and audio noise.

In another embodiment of the invention (not shown in FIG. 13), the switch 18 has a fourth position for feeding audio signals to a mini speaker incorporated in pocket set 150, and video signals to a mini video display also incorporated therein, for permitting pocket set 15 to be operated as a conventional handheld TV receiver.

Each of 183, 185, and 187 electronic means lead to a plug (not shown) for plug-in connection of an interface multicable 65, for another plug-in connection with headset or goggles 6.

Note that illustrated optical devices are given as examples only. As previously mentioned, the microtubes 11, 12, and 13 described above for purposes of illustration of various embodiments of the invention, can be replaced by other types of micro video displays. Liquid crystal displays (LCD) are one example. Such LCD imaging devices are used in miniature television receivers, such as the Casi TV-200 (registered U.S. Trademark) handheld television set. The latter is a monochrome television system manufactured by Casio (registered U.S. Trademark). Further note that the integrated circuitry and other miniaturized electronics, used in handheld television units such as the referenced Casio units, are applicable for use in the present invention. Appropriate drive circuitry may be additionally required for driving microtubes 11, 12 and 13. The image intermittency electronic circuitry is similar to circuitry used in the Toshiba (Trademark) 3D camcorder technology written in standard NTSC TV.

The above described invention provides a plurality of features that other prior television systems cannot provide simultaneously, such as: (1) color images, (2) panoramic viewing, (3) suppression of video and audio noise, (4) individual viewing, (5) home recording of broadcasted 3D television programs, (6) a relatively lower cost but improved TV set, (7) individualized viewing of different programs by a plurality of viewers in the same room, (8) high resolution images, (9) screenless television, (10) comfortable seat and head positioning, (11) three-dimensional television, (12) freedom of viewer to look at other than a fixed place, (13) remote control via the user wearing all controls in a pocket set, (14) user participation in surrounding conversations, and finally (15) individual user adjustment of sound and video levels to suit individual's requirements.

In summary, the invention provides a new concept in television, economical screenless panoramic stereovision. This concept, when compared with conventional television, and even prior art 3DTV offers a viewer the perception of being part of the observed scene, of literally stepping into the picture.

The illustrations made for the various embodiments of the invention are not meant to be limiting, and other variations thereof may be apparent to those of skill in the field of the present technology, as well as its applications in other fields than television, which variations and applications are covered by the scope of spirit of the appended claims.

What I claim is:

1. A screenless or screen independent color and stereo television system, for providing a high definition panoramic image comprising:

means for selectively receiving and controlling video and associated audio signals, including means for selectively providing on separate output channels, right and left components of said audio signals, right and left green, red, and blue video components of color video signals, and power for video display means;

a pair of goggles included as part of a headset including:

means for mounting said headset on a user's head;

earphone means for receiving said right and left components of said audio signals and reproducing the sound content thereof for presentation directly to a right and a left ear of a user, respectively;

right and left video display means associated with a user's right and left eyes, respectively, mounted in said pair of goggles, respectively, for projecting said right and left video signals, respectively, said right and left video display means each including three mini monochrome display means for receiving and displaying video images associated with respective green, red, and blue video components, color superimposition means for superimposing said video images, and at least one stage of optical image amplification means, for providing video images to said right and left eyes, respectively, for effecting a panoramic stereo vision to a user or viewer; and multicable means for electrically connecting said audio and video signals, and said power from said receiving means to said headset.

2. The stereo television system of claim 1 wherein said pocket set further includes means for selecting one of a plurality of television channel signals received by said pocket set.

3. The stereo television system of claim 1, wherein said pocket set further includes means for selectively controlling the degree of separation between said right and left video components.

4. The stereo television system of claim 1, wherein said pocket set further includes means for selectively controlling the degree of separation between said right and left audio components.

5. The stereo television system of claim 1, wherein said receiving and controlling means further includes means for selectively receiving either 2D or 3D television signals.

6. A screenless or screen independent color and stereo television system, for providing a high definition panoramic image, comprising:
  a pocket set including:
    (a) tuner means for channel selection, receiving, adjusting and controlling TV signals;
    (b) means for selection of either 2D or 3D transmission modes, and
    (c) means for separating or mixing right and left audio and video components;
  a pair of goggles or headset, including:
    (a) means for fixation to a user's head,
    (b) earphone means for reproducing the sound content of received stereo audio signals directly to appropriate right and left ears of the user,
    (c) right and left eye display means, each including a set of three mini monochrome video display means for displaying green, red, and blue video components, respectively, provided with color superimposition means for superimposing said video components, and at least one stage of optical image amplification means, for providing a panoramic stereo vision to the viewer; and
  means for electrically interconnecting said pocket set to said goggles or headset, for providing the latter voltages for operating said video display means, and audio signals for operating said earphone means.

7. The television system of claim 6, wherein said pocket set further includes a build-in television antenna connected to said tuner means.

8. The television system of claim 6, wherein said pocket set further includes a build-in energy source for providing power to said audio and video television receiver.

9. The television system of claim 6, wherein said pocket set further includes an electronic device for providing right channel video components to a right channel video output, and left channel video components to a left channel video output, for receiving three-dimensional television programs from right and left channel video components broadcast on the same carrier frequency but with image by image intermittency.

10. The television system of claim 6, wherein said pocket set further includes electronic means for conducting red video signals in white color as said left video signal, and green video signals also in white as said right video signal, for receiving three-dimension monochrome television programs written in conventional green/red technology, where left side images are in red, and right side images are in green, and the red/green images are broadcast in superposition.

11. The television system of claim 6, wherein said pocket set further includes an electronic device for simultaneously providing said right and left channel video signals, for receiving conventional television programs.

12. The television system of claim 6, wherein said headset further includes mechanical means for adjusting said right and left optical means at a desired distance from the eyes of a user.

13. The television system of claim 6, wherein said headset further includes focusing means for adjusting the right and left video display means to the individual right and left eye dioptries of the user.

14. The television system of claim 6, wherein said headset further includes means for adjusting audio volume individually to right and left ear auditive capacity.

15. The television system of claim 6, wherein said headset further includes means for manually adjusting video intensity individually to right and left eye viewing capacity or light sensitivity.

16. The television system of claim 6, wherein said headset further includes an interrupter switch for permitting a user to selectively cutoff the audio content of a program being viewed.

17. The television system of claim 6, wherein said optical means each include a wide angle ocular lens respectively, for providing a field of view up to 150 degrees for each eye.

18. The television system of claim 6, wherein each of said sets of three monochrome mini video display means include two dichroid transparent mirrors for providing said color superimposition means.

19. The television system of claim 6, wherein each of said sets of three monochrome mini video display means consist of three black and white mini video displays, respectively provided with a green, red, or blue color filters, respectively.

20. The television system of claim 6, wherein said headset further includes microphone means mounted proximate said earphone means for permitting a user to participate in conversations with other persons in the vicinity of said user.

21. The television system of claim 6, wherein said headset further comprises two microphones mounted on right and left sides of said headset, for permitting a user to participate in conversations with other persons who are viewing the same television program, and in close proximity to one another.

22. The television system of claim 16, wherein said headset further includes an interrupter switch for permitting a user to selectively turn off said microphones.

23. The television system of claim 6, wherein said right and left optical means of said headset each include a two stage optical system consisting of individual relatively thin objective lens positioned near each one of said video display means, and an ocular lens positioned between said objective lens and an associated eye of a user, for providing a field of view of up to 150 degrees to each eye, respectively.

24. The television system of claim 23, wherein said two stage optical systems each further include at least one plane or curved reflective surface inserted between said objective and ocular lenses for shortening the required distance between said video display means and a user's eyes.

25. The television system of claim 23, wherein said right and left optical means each further include appropriately coloring said objective lenses a green, red, and blue color, respectively, for providing color filtering.

26. In a screenless color and stereo television system for providing a high definition panoramic image, said system including means for selectively receiving and controlling stereo video and stereo audio signals, for providing as output signals right and left channel audio signals, and right and left channel green, red, and blue components of color video output signals, respectively, and further including a headset with a pair of goggle like enclosures associated with a users right and left eyes, respectively, each of said enclosures housing three mini monochrome display means for receiving said video output signals and projecting light images associated therewith respectively, the method comprising the steps of:

amplifying the images projected from each one of said mini monochrome display means in each of said enclosures;

superimposing the three images associated with each eye of a user, respectively for obtaining a desired colored image; and     focusing the superimposed images onto each associated eye for effecting a color panoramic stereo image for observation by said user.

27. The method of claim 26, further including the steps of:

vertically aligning in a column with respect to a head of a user, said three mini monochrome display means; and     reflecting the images projected from said mini display means at least once before transmission to an associated eye, for reducing the size of said respective enclosures.

28. The method of claim 26, further including the steps of:

aligning said mini display means in each enclosure to lie in substantially the same vertical plane as the central vertical axis of an associated eye of said user;

arranging said mini display means in each enclosure in a triangular pattern relative to one another;

passing the images from said mini display means in each enclosure through different color filters;

passing the colored images from said filters through a crossed dichroic plate system for providing the superimposing step for said images along a path leading to an associated eye of said user.

29. A screenless color and stereo television system for providing a high definition stereo panoramic image, with stereo sound, said system comprising:

means for selectively receiving and controlling stereo video and stereo audio signals, for providing as output signals right and left channel audio signals, and right and left channel green, red, and blue components of color video output signals, respectively;

a headset with first and second goggle like enclosures associated with a user's right and left eyes, respectively;

each of said first and second enclosures including:

three mini monochrome display means for receiving said right and left channel color components, respectively, of said video output signals from said receiving means and projecting light images associated therewith, respectively; and         first optical means for amplifying the images projected from each one of said three mini monochrome display means; and         superimpositioning means for superimposing the associated said three amplified light images, for obtaining a desired colored image for presentation to the associated right or left eye of said user.

30. The stereo television system of claim 29, wherein said optical means includes color filter means for coloring the light images from said mini monochrome display means to have the color associated with their respective color component.

31. The stereo television system of claim 29, further including second optical means both for further amplifying said superimposed images, and for focusing the images upon the right and left eyes of a user, respectively.

32. The stereo television system of claim 29, wherein each one of said mini monochrome display means consists of a miniature cathode ray tube.

33. The stereo television system of claim 29, wherein in each of said first and second enclosures, three mini monochrome display means are vertically aligned in a column with respect to the vertical axis of the head of a user.

34. The stereo television system of claim 32, further including in each one of said first and second enclosures, reflecting means for reflecting the images projected from said mini display means at least once before transmission to an associated eye, for reducing the size of said first and second enclosures.

35. The stereo television system of claim 29, wherein in each one of said first and second enclosures, said three mini monochrome display means are aligned to lie in substantially the same vertical plane as the central vertical axis of an associated eye of said user, and are further arranged in a triangular pattern relative to one another.

36. The stereo television system of claim 35, wherein said superimpositioning means consists of crossed dichroid plates for passing and reflecting the light images from said first through third mini display means along a path intercepting the associated right and left eyes of said user.

37. The stereo television system of claim 36, further including second optical means between said crossed dichroid plates and the associated eyes of said user, for both further amplifying and focusing the superimposed images.

\* \* \* \* \*